United States Patent
Chae et al.

(10) Patent No.: US 10,694,566 B2
(45) Date of Patent: *Jun. 23, 2020

(54) METHOD AND APPARATUS FOR TRANSMITTING SIGNAL IN A WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,770

(22) Filed: May 1, 2019

(65) Prior Publication Data

US 2019/0261441 A1    Aug. 22, 2019

Related U.S. Application Data

(63) Continuation of application No. 14/830,649, filed on Aug. 19, 2015, now Pat. No. 10,321,499.

(Continued)

(51) Int. Cl.
*H04W 4/00* (2018.01)
*H04W 76/14* (2018.01)
(Continued)

(52) U.S. Cl.
CPC ............ *H04W 76/14* (2018.02); *H04B 1/713* (2013.01); *H04L 5/14* (2013.01); *H04W 72/02* (2013.01);
(Continued)

(58) Field of Classification Search
USPC ..................... 370/230, 252, 328, 329, 330
See application file for complete search history.

(56) References Cited

U.S. PATENT DOCUMENTS 10,321,499 B2 * 6/2019 Chae .................... H04W 76/14
2009/0073929 A1   3/2009 Malladi et al.
(Continued)

FOREIGN PATENT DOCUMENTS

CN    102036395    4/2011
CN    102334368    1/2012
(Continued)

OTHER PUBLICATIONS

CATT, "Data Transmission in D2D Communication," 3GPP TSG-RAN WG1 Meeting #77, R1-141998, May 19-23, 2014, 4 pages.
(Continued)

*Primary Examiner* — Kwang B Yao
*Assistant Examiner* — Nguyen H Ngo
(74) *Attorney, Agent, or Firm* — Lee Hong Degerman Kang & Waimey

(57) ABSTRACT

A method for transmitting a signal by a Device-to-Device (D2D) User Equipment (UE) in a wireless communication system is disclosed. The method includes determining a resource pool for a D2D control signal, determining a resource pool for a D2D communication signal based on the resource pool for a D2D control signal, and transmitting a D2D communication signal using the resource pool for a D2D communication signal. Subframes of the resource pool for a D2D communication signal were reindexed, starting from a first subframe following a last subframe of the resource pool for a D2D control signal.

8 Claims, 10 Drawing Sheets

Related U.S. Application Data

(60) Provisional application No. 62/039,437, filed on Aug. 20, 2014, provisional application No. 62/060,565, filed on Oct. 6, 2014, provisional application No. 62/085,640, filed on Nov. 30, 2014.

(51) Int. Cl.
  *H04W 72/02* (2009.01)
  *H04B 1/713* (2011.01)
  *H04L 5/14* (2006.01)
  *H04W 72/04* (2009.01)
  *H04W 88/08* (2009.01)

(52) U.S. Cl.
  CPC .... *H04W 72/0406* (2013.01); *H04W 72/0446* (2013.01); *H04W 88/08* (2013.01)

(56) References Cited

U.S. PATENT DOCUMENTS

| | | | | |
|---|---|---|---|---|
| 2009/0175292 | A1* | 7/2009 | Noh | H04W 74/006 370/462 |
| 2011/0081914 | A1* | 4/2011 | Lin | H04W 16/10 455/450 |
| 2013/0142268 | A1* | 6/2013 | Gao | H04W 76/14 375/252 |
| 2013/0225184 | A1* | 8/2013 | Liu | H04W 72/042 455/450 |
| 2013/0308551 | A1* | 11/2013 | Madan | H04W 76/14 370/329 |
| 2013/0322358 | A1 | 12/2013 | He et al. | |
| 2014/0003262 | A1 | 1/2014 | He et al. | |
| 2014/0016619 | A1 | 1/2014 | Kim et al. | |
| 2014/0321452 | A1* | 10/2014 | Choi | H04W 8/005 370/350 |
| 2015/0023264 | A1 | 1/2015 | Tiirola et al. | |
| 2015/0156757 | A1* | 6/2015 | Kalhan | H04L 1/1607 370/330 |
| 2015/0208384 | A1* | 7/2015 | Baghel | H04W 72/04 455/450 |
| 2016/0057798 | A1 | 2/2016 | Chae et al. | |
| 2017/0048856 | A1 | 2/2017 | Sorrentino et al. | |
| 2017/0064704 | A1* | 3/2017 | Seo | H04W 72/0446 |
| 2017/0142741 | A1* | 5/2017 | Kaur | H04W 56/002 |

FOREIGN PATENT DOCUMENTS

| | | |
|---|---|---|
| CN | 103069899 | 4/2013 |
| CN | 103687042 | 3/2014 |
| RU | 2011142449 | 4/2013 |
| WO | 2013/162333 | 10/2013 |
| WO | 2014/010858 | 1/2014 |

OTHER PUBLICATIONS

Federal Service for Intellectual Property Office for Russian Application No. 2017106239, Notice of Allowance dated Feb. 21, 2018, 11 pages.
U.S. Appl. No. 14/830,649, Office Action dated Jun. 14, 2017, 18 pages.
Alcatel-Lucent Shanghai Bell, et al., "Resource allocation and selection for scheduling assignment for D2D Communication," 3GPP TSG RAN WG1 Meeting #78, R1-143019, Aug. 2014, 6 pages.
LG Electronics, "Remaining issues for D2D physical channel design," 3GPP TSG RAN WG1 Meeting #78, R1-143178, Aug. 2014, 4 pages.
Panasonic, "Half duplex issue and solutions in D2D," 3GPP TSG RAN WG1 Meeting #77, R1-142187, May 2014, 4 pages.
European Patent Office Application Serial No. 15002430.5, Search Report dated Jan. 8, 2016, 11 pages.
CATT, "Frequency hopping design in D2D communication," 3GPP TSG RAN WG1 Meeting #78, R1-142897, Aug. 2014, 5 pages.
Huawei, et al., "Frequency hopping for D2D communication," 3GPP TSG RAN WG1 Meeting #78, R1-142837, Aug. 2014, 8 pages.
Panasonic, "Time/frequency hopping for D2D communication/SA," 3GPP TSG RAN WG1 Meeting #78, R1-143000, Aug. 2014, 5 pages.
PCT International Application No. PCT/KR2015/007823, Written Opinion of the International Searching Authority dated Nov. 11, 2015, 11 pages.
State Intellectual Property Office of the People's Republic of China Application Serial No. 201580043749.7, Office Action dated Jun. 27, 2019, 15 pages.

\* cited by examiner (a)

(b)

METHOD AND APPARATUS FOR TRANSMITTING SIGNAL IN A WIRELESS COMMUNICATION SYSTEM

CROSS-REFERENCE TO RELATED APPLICATIONS

This application is a continuation of U.S. patent application Ser. No. 14/830,649, filed on Aug. 19, 2015, now U.S. Pat. No. 10,321,499, which claims the benefit of U.S. Provisional Patent Application No(s). 62/039,437, filed on Aug. 20, 2014, 62/060,565, filed on Oct. 6, 2014 and 62/085,640, filed on Nov. 30, 2014, the contents of which are all hereby incorporated by reference herein in their entirety.

TECHNICAL FIELD

The present invention relates to a wireless communication system and more particularly, to a method and apparatus for transmitting and receiving a signal using frequency hopping in Device-to-Device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will simplify procedures of an evolved Node B (eNB), reduce the power consumption of devices participating in D2D communication, increase data transmission rates, increase the accommodation capability of a network, distribute load, and extend cell coverage.

DISCLOSURE

Technical Problem

An object of the present invention devised to solve the problem lies on Device-to-Device (D2D) hopping methods that can prevent resource collision.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method for transmitting a signal by a Device-to-Device (D2D) User Equipment (UE) in a wireless communication system, including determining a resource pool for a D2D control signal, determining a resource pool for a D2D communication signal based on the resource pool for a D2D control signal, and transmitting a D2D communication signal using the resource pool for a D2D communication signal. Subframes of the resource pool for a D2D communication signal were reindexed, starting from a first subframe following a last subframe of the resource pool for a D2D control signal.

In another aspect of the present invention, provided herein is a UE for transmitting a Device-to-Device (D2D) signal in a wireless communication system, including a transmission module, and a processor. The processor is configured to determine a resource pool for a D2D control signal, determine a resource pool for a D2D communication signal based on the resource pool for a D2D control signal, and transmit a D2D communication signal using the resource pool for a D2D communication signal. Subframes of the resource pool for a D2D communication signal were reindexed, starting from a first subframe following a last subframe of the resource pool for a D2D control signal.

The above aspects of the present invention may include all or a part of the followings.

The subframes may be reindexed with a modulo 10 operation, while increasing a subframe index, starting from a first subframe of the resource pool for a D2D communication signal.

If frequency hopping is used for transmission of the D2D communication signal, a lowest Physical Resource Block (PRB) indexes of PRBs to which the D2D communication signal is mapped may be changed between a first PRB index and a second PRB index, according to a change of reindexed subframe number.

If subband-based hopping is used for transmission of the D2D communication signal, a slot index used in determining a PRB index may be produced by performing reindexing, starting from a slot of a first subframe following a last subframe of the resource pool for a D2D control signal.

An initial value of a pseudorandom sequence generation function used in determining the PRB index may be fixed to 0.

The number of subbands may be 2 or larger.

If a duplex mode of the D2D UE is Time Division Duplex (TDD), the first subframe may be an uplink subframe following a last subframe of the resource pool for a D2D control signal.

Advantageous Effects

According to the present invention, when hopping is used between D2D UEs having different transmission patterns, resource collision can be prevented.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
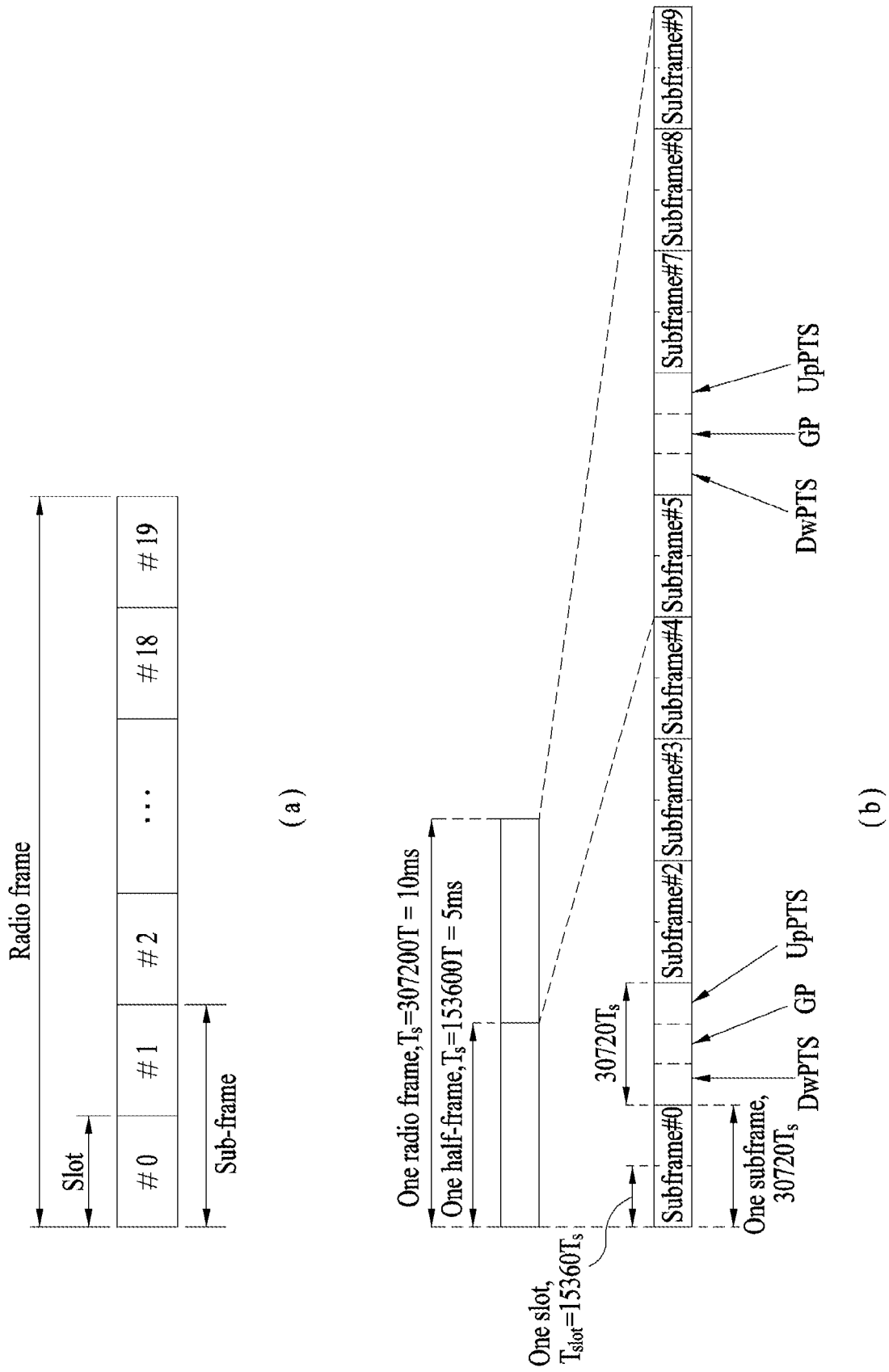
FIG. 1 illustrates a radio frame structure.

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "Base Station (BS)" may be replaced with terms such as "fixed station", "Node-B", "eNode-B (eNB)", and "access point." The term "relay" may be replaced with such terms as "Relay Node (RN)" and "Relay Station (RS)". The term "terminal" may also be replaced with such terms as "User Equipment (UE)", "Mobile Station (MS)", "Mobile Subscriber Station (MSS)", and "Subscriber Station (SS)".

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd Generation Partnership Project (3GPP) system, a 3GPP Long Term Evolution (LTE) system, an LTE-Advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be embodied through radio technologies such as Universal Terrestrial Radio Access (UTRA) or CDMA2000. TDMA may be embodied through radio technologies such as Global System for Mobile communication (GSM)/General Packet Radio Service (GPRS)/Enhanced Data rates for GSM Evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the Universal Mobile Telecommunications System (UMTS). 3rd Generation Partnership Project (3GPP) Long Term Evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

LTE/LTE-A Subframe Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to Frequency Division Duplex (FDD) and radio frame structure type 2 applicable to Time Division Duplex (TDD).

FIG. 1(*a*) illustrates radio frame structure type 1. A downlink radio frame is divided into 10 subframes. Each subframe includes two slots in the time domain. The duration of transmission of one subframe is defined as a Transmission Time Interval (TTI). For example, a subframe may have a duration of 1 ms and one slot may have a duration of 0.5 ms. A slot may include a plurality of OFDM symbols in the time domain and a plurality of Resource Blocks (RBs) in the frequency domain. Since 3GPP LTE employs OFDMA for downlink, an OFDM symbol represents one symbol period. An OFDM symbol may be referred to as an SC-FDMA symbol or symbol period. A Resource Block (RB), which is a resource allocation unit, may include a plurality of consecutive subcarriers in a slot.

The number of OFDM symbols included in one slot depends on the configuration of a Cyclic Prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CP. For the extended CP, each slot may include, for example, 6 OFDM symbols. When a channel state is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a Physical Downlink Control Channel (PDCCH) and the other OFDM symbols may be allocated to a Physical Downlink Shared Channel (PDSCH).

FIG. 1(b) illustrates radio frame structure type 2. A type-2 radio frame includes two half frames, each of which has 5 subframes, Downlink pilot Time Slots (DwPTSs), Guard Periods (GPs), and Uplink pilot Time Slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL. Regardless of the types of radio frames, a subframe consists of two slots.

The illustrated radio frame structures are merely examples, and various modifications may be made to the number of subframes included in a radio frame, the number of slots included in a subframe, or the number of symbols included in a slot.

Figure 2:
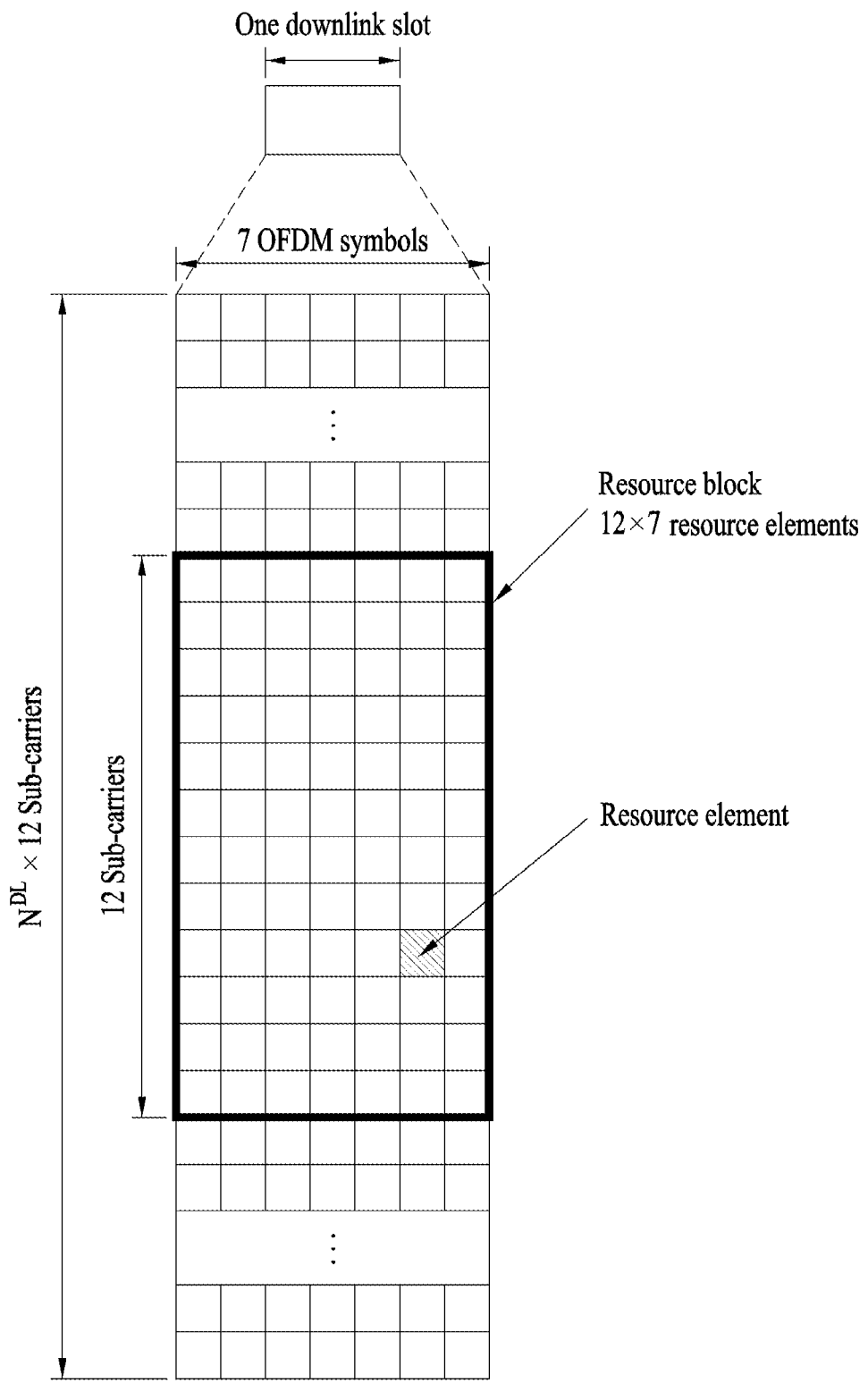
FIG. 2 illustrates a structure of a downlink resource grid for the duration of one downlink slot.

FIG. 2 is a diagram illustrating a resource grid of one DL slot. One DL slot includes 7 OFDM symbols in the time domain and an RB includes 12 subcarriers in the frequency domain. However, embodiments of the present invention are not limited thereto. For the normal CP, a slot may include 7 OFDM symbols. For the extended CP, a slot may include 6 OFDM symbols. Each element in the resource grid is referred to as a Resource Element (RE). An RB includes 12 7 REs. The number NDL of RBs included in a DL slot depends on a DL transmission bandwidth. A UL slot may have the same structure as the DL slot.

Figure 3:
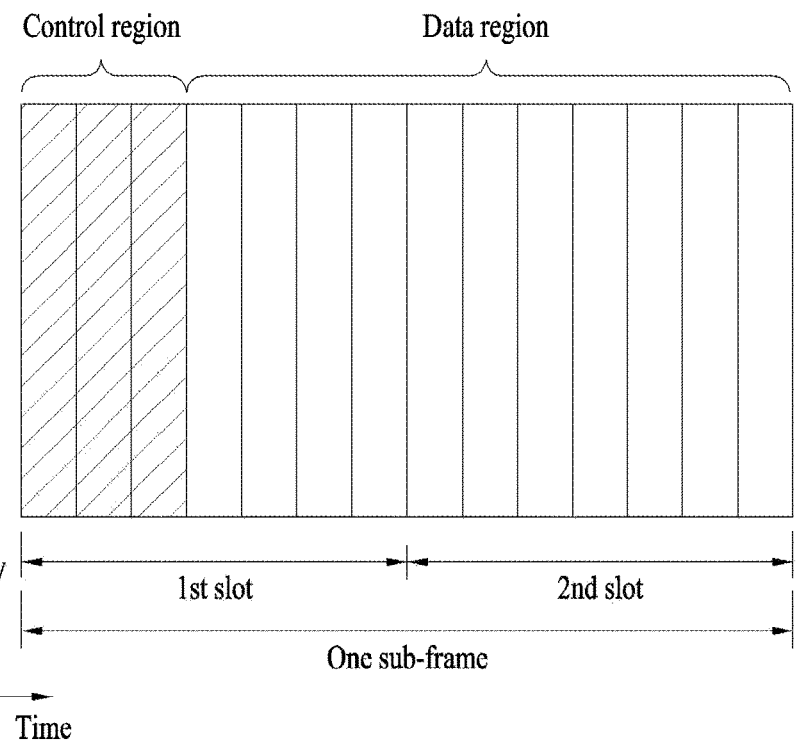
FIG. 3 illustrates a structure of a downlink subframe.

FIG. 3 illustrates a DL subframe structure. Up to three OFDM symbols in the leading part of the first slot in a DL subframe corresponds to a control region to which a control channel is allocated. The other OFDM symbols of the DL subframe correspond to a data region to which a PDSCH is allocated. DL control channels used in 3GPP LTE include, for example, a Physical Control Format Indicator Channel (PCFICH), a Physical Downlink Control Channel (PDCCH), and a Physical Hybrid Automatic Repeat reQuest (HARQ) Indicator Channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called Downlink Control Information (DCI). The DCI includes UL or DL scheduling information or a UL transmit power control command for a UE group. The PDCCH may deliver information about the resource allocation and transport format of a DL Shared Channel (DL-SCH), resource allocation information of a UL Shared Channel (UL-SCH), paging information of a Paging Channel (PCH), system information on the DL-SCH, information about resource allocation for a higher-layer control message such as a random access response transmitted on the PDSCH, a set of transmit power control commands for individual UEs in a UE group, transmit power control information, and Voice over Internet Protocol (VoIP) activation information. A plurality of PDCCHs may be transmitted in the control region. A UE may monitor a plurality of PDCCHs. A PDCCH is transmitted in an aggregation of one or more consecutive control channel elements (CCEs). A CCE is a logical allocation unit used to provide a PDCCH at a coding rate based on the state of a radio channel A CCE corresponds to a plurality of RE groups. The format of a PDCCH and the number of available bits for the PDCCH are determined depending on the correlation between the number of CCEs and the coding rate provided by the CCEs. An eNB determines the PDCCH format according to DCI transmitted to a UE and adds a Cyclic Redundancy Check (CRC) to the control information. The CRC is masked with an Identifier (ID) known as a Radio Network Temporary Identifier (RNTI) according to the owner or usage of the PDCCH. If the PDCCH is directed to a specific UE, its CRC may be masked with a Cell-RNTI (C-RNTI) of the UE. If the PDCCH is for a paging message, the CRC of the PDCCH may be masked with a Paging Radio Network Temporary Identifier (P-RNTI). If the PDCCH delivers system information (more specifically, a System Information Block (SIB)), the CRC may be masked with a system information ID and a System Information RNTI (SI-RNTI). To indicate a random access response which is a response to a random access preamble transmitted by a UE, the CRC may be masked with a Random Access-RNTI (RA-RNTI).

Figure 4:
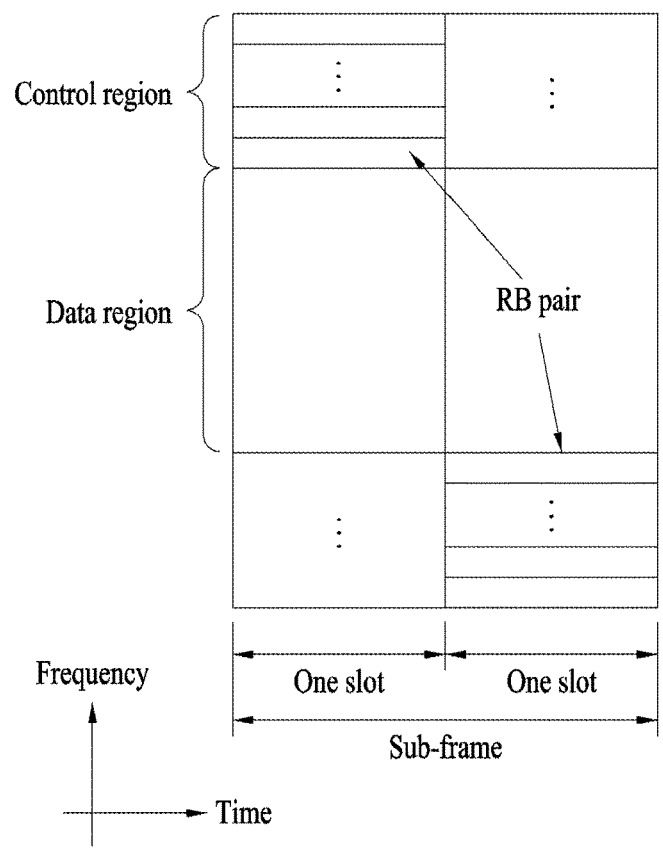
FIG. 4 illustrates a structure of an uplink subframe.

FIG. 4 illustrates a UL subframe structure. A UL subframe may be divided into a control region and a data region in the frequency domain. A Physical Uplink Control Channel (PUCCH) carrying uplink control information is allocated to the control region. A Physical Uplink Shared Channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs from an RB pair occupy different subcarriers in two slots. This is called frequency hopping of the RB pair allocated to the PUCCH over a slot boundary.

PUSCH Hopping

To achieve frequency diversity, frequency hopping may be applied to PUSCH transmission. There are two types of frequency hopping in the LTE/LTE-A system: type 1 frequency hopping and type 2 frequency hopping. In the type 1 frequency hopping scheme, one of ¼, −¼, and ½ of a hopping bandwidth is selected according to hopping bits indicated by UL grant DCI. Specifically, the lowest PRB index of a first slot is determined by $n_{PRB}^{S1}(i)=\tilde{n}_{PRB}^{S1}(i)+\tilde{N}_{RB}^{HO}/2$. $n_{PRB}^{S1}(i)=RB_{START}$ where $RB_{START}$ may be obtained from a UL grant. Once the lowest PRB index of the first slot is determined, the lowest PRB index of a second slot is determined by [Equation 1] and [Table 1].

$$n_{PRB}^{S1}(i)=\tilde{n}_{PRB}^{S1}(i)+\tilde{N}_{RB}^{HO}/2$$

$$n_{PRB}(i)=\tilde{n}_{PRB}(i)+\tilde{N}_{RB}^{HO}/2 \qquad \text{[Equation 1]}$$

where $N_{RB}^{HO}$ is a hopping offset (pusch-HoppingOffset) ranging from 0 to 98. If $N_{RB}^{HO}$ is an odd number, $\tilde{N}_{RB}^{HO}=N_{RB}^{HO}+1$ and if $N_{RB}^{HO}$ is an even number, $\tilde{N}_{RB}^{HO}=N_{RB}^{HO}$.

TABLE 1

| System BW $N_{RB}^{UL}$ | Number of Hopping bits | Information in hopping bits | $\tilde{n}_{PRB}(i)$ |
|---|---|---|---|
| 6-49 | 1 | 0 | $(\lfloor N_{RB}^{PUSCH}/2 \rfloor + \tilde{n}_{PRB}^{S1}(i))$ mod $N_{RB}^{PUSCH}$ |
|  |  | 1 | Type 2 PUSCH Hopping |
| 50-110 | 2 | 00 | $(\lfloor N_{RB}^{PUSCH}/4 \rfloor + \tilde{n}_{PRB}^{S1}(i))$ mod $N_{RB}^{PUSCH}$ |
|  |  | 01 | $(-\lfloor N_{RB}^{PUSCH}/4 \rfloor + \tilde{n}_{PRB}^{S1}(i))$ mod $N_{RB}^{PUSCH}$ |
|  |  | 10 | $(\lfloor N_{RB}^{PUSCH}/2 \rfloor + \tilde{n}_{PRB}^{S1}(i))$ mod $N_{RB}^{PUSCH}$ |
|  |  | 11 | Type 2 PUSCH Hopping |

In [Table 1], $N_{RB}^{PUSCH}$ is the number of PUSCH RBs (i.e., a hopping bandwidth).

Figure 5:
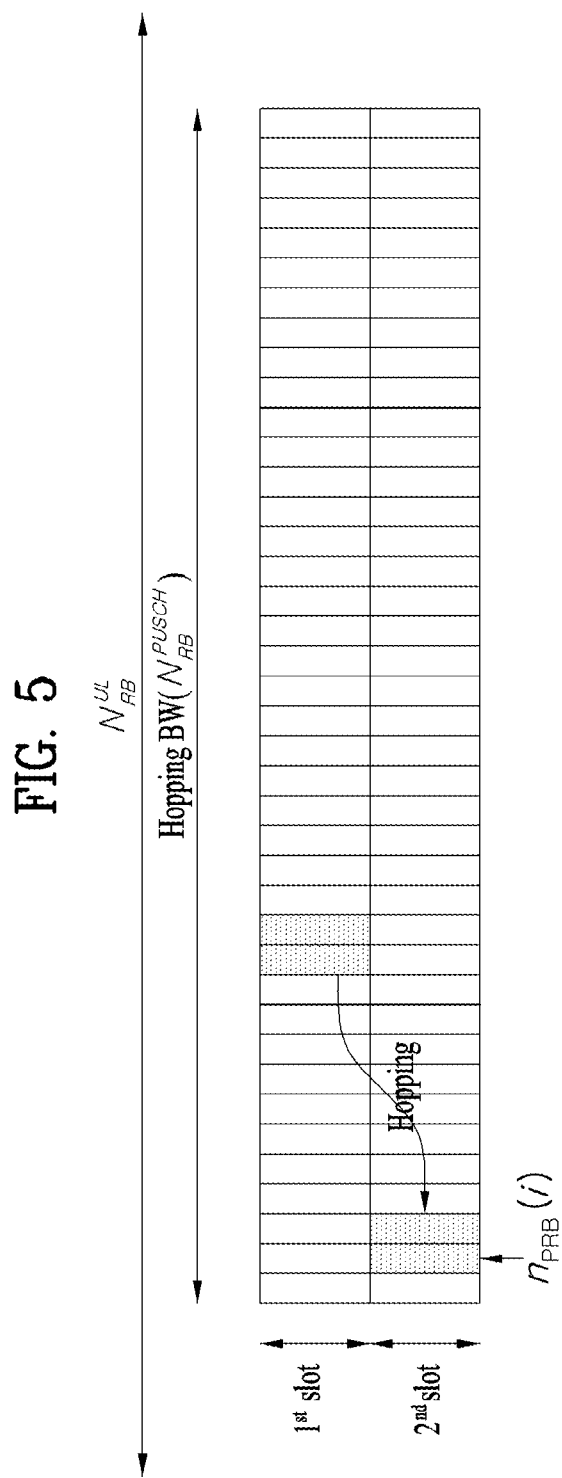
FIGS. 5 and 6 illustrate frequency hopping.

FIG. 5 illustrates an example of type 1 hopping. In FIG. 5, it is assumed that two hopping bits are set to 01. Thus, $(-\lfloor N_{RB}^{PUSCH}/4 \rfloor + \tilde{n}_{PRB}^{S1}(i))$ mod $N_{RB}^{PUSCH}$. The lowest PRB index $n_{PRB}(i)$ of the second slot may be determined by [Equation 1], which is hopped from the lowest PRB index of the first slot by −¼ of the hopping bandwidth.

If the hopping mode is inter-subframe in type 1 frequency hopping, first-slot resource allocation is applied to an even-numbered CURRENT_TX_NB and second-slot resource allocation is applied to an odd-numbered CURRENT_TX_NB. CURRENT_TX_NB represents the transmission number for a transport block (TB) transmitted in slot $n_s$.

Type 2 PUCCH hopping is based on subbands. If mirroring is not applied, the lowest PRB index of slot $n_s$ is determined by [Equation 2].

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases} \qquad \text{[Equation 2]}$$

where $N_{sb}$ is the number of subbands indicated by higher-layer signaling. $\tilde{n}_{PRB}(n_s)$ is given as [Equation 3].

$$\tilde{n}_{PRB}(n_s) = \qquad \text{[Equation 3]}$$
$$(\tilde{n}_{VRB} + f_{hop}(i) \cdot N_{RB}^{sb} + ((N_{RB}^{sb}-1) - 2(\tilde{n}_{VRB} \bmod N_{RB}^{sb})) \cdot f_m(i)) \bmod(N_{RB}^{sb} \cdot N_{sb})$$

$$i = \begin{cases} \lfloor n_s/2 \rfloor & \text{inter-subframe hopping} \\ n_s & \text{intra and inter-subframe hopping} \end{cases}$$

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

A hopping function $f_{hop}(i)$ is given as [Equation 4].

$$f_{hop}(i) = \begin{cases} 0 & N_{sb}=1 \\ \left(f_{hop}(i-1) + \sum_{k=i\cdot10+1}^{i\cdot10+9} c(k)\times 2^{k-(i\cdot10+1)}\right)\bmod N_{sb} & N_{sb}=2 \\ \left(f_{hop}(i-1) + \left(\sum_{k=i\cdot10+1}^{i\cdot10+0} c(k)\times 2^{k-(i\cdot10+1)}\right)\bmod(N_{sb}-1)+1\right)\bmod N_{sb} & N_{sb}>2 \end{cases} \qquad \text{[Equation 4]}$$

A mirroring function $f_m(i)$ is given as [Equation 5].

$$f_m(i) = \begin{cases} i \bmod 2 & N_{sb}=1 \text{ and intra and inter-subframe hopping} \\ CURRENT\_TX\_NB \bmod 2 & N_{sb}=1 \text{ and inter-subframe hopping} \\ c(i\cdot 10) & N_{sb}>1 \end{cases} \qquad \text{[Equation 5]}$$

where $f_{hop}(-1)=0$ and CURRENT_TX_NB represents the transmission number for a TB transmitted in slot $n_s$. A pseudorandom sequence generation function $c(i)$ (refer to 3GPP TS 36.211, 7.2) is initialized: $c_{init}=N_{ID}^{cell}$ for frame structure type 1 and $c_{init}=2^9 \cdot (n_f \bmod 4)+N_{ID}^{cell}$ from the start of each frame, for frame structure type 2.

In other words, in type 2 hopping, mirroring is applied, that is, the sequence of using transmission resources in a subband is reversed, while hopping is performed on a subband basis according to the hopping function $f_{hop}(i)$. The hopping function is determined by a pseudorandom sequence c(i) which is a function of a cell ID (a mirroring pattern is also a function of a cell ID). Therefore, the same hopping pattern is used for all UEs within one cell. Cell-specific mirroring may be used in type 2 hopping.

Figure 6:
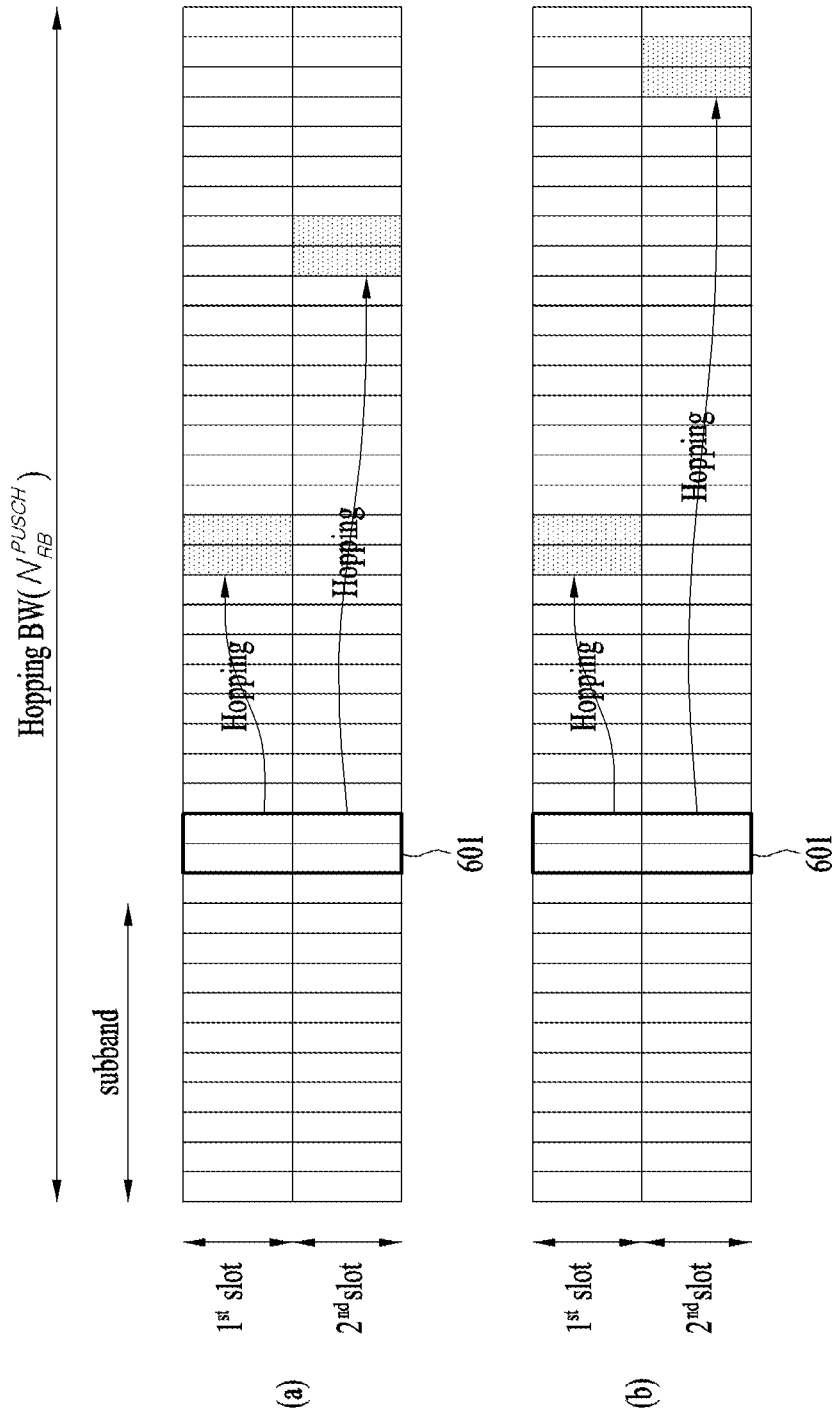

FIG. 6 illustrates examples of type 2 hopping for the number of subbands $N_{sb}$ of 4. In an example of FIG. 6(a), a Virtual RB (VRB) 601 hops by one subband in the first slot and by two bands in the second slot. In an example of FIG. 6(b), mirroring is applied to the second slot.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

The D2DSS may have a transmission period equal to or larger than 40 ms. One or more symbols may be used for D2DSS transmission in a subframe.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS), and the SD2DSS may be configured to have a similar/modified/repeated structure of an M-sequence or a Secondary Synchronization Signal (SSS).

A D2D UE should select a D2D synchronization source based on the same priority criterion. In an out-of-coverage situation, if the signal strengths of all received D2DSSs are equal to or less than a predetermined value, a UE may be a synchronization source. If UEs synchronize their timing with an eNB, the synchronization source may be the eNB and the D2DSS may be a PSS/SSS. A D2DSS of a synchronization source derived from the eNB may be different from a D2DSS of a synchronization source which is not derived from the eNB.

A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS.

The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
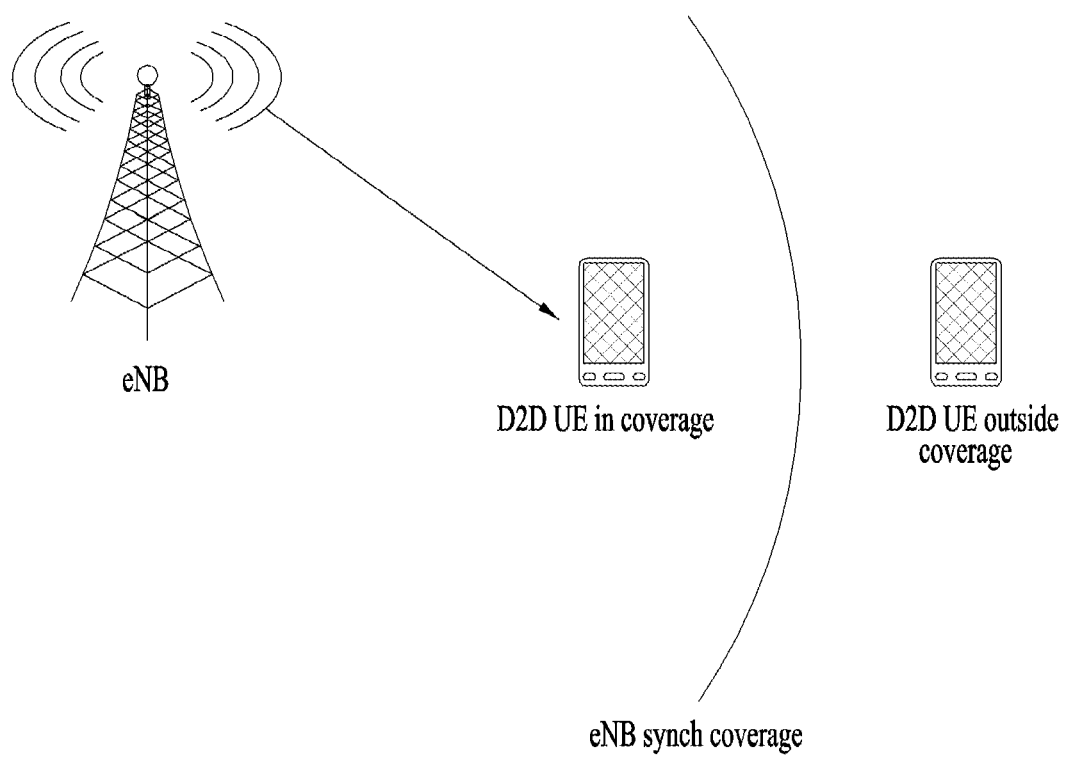
FIGS. 7, 8, 9 and 10 illustrate a hopping method according to an embodiment of the present invention.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

Figure 8:
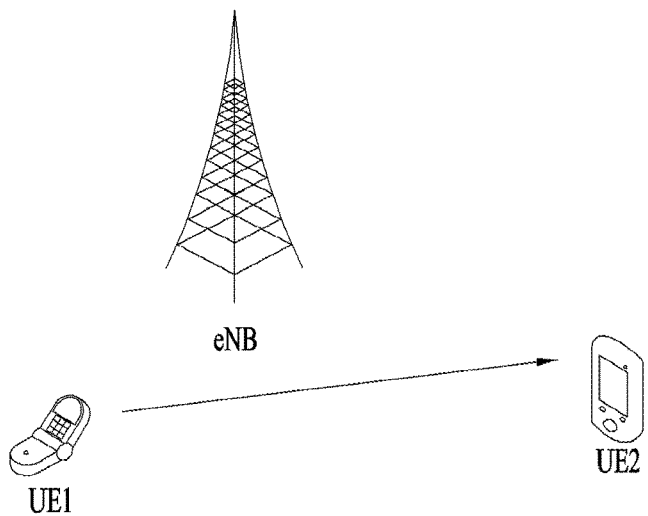
Figure 8:
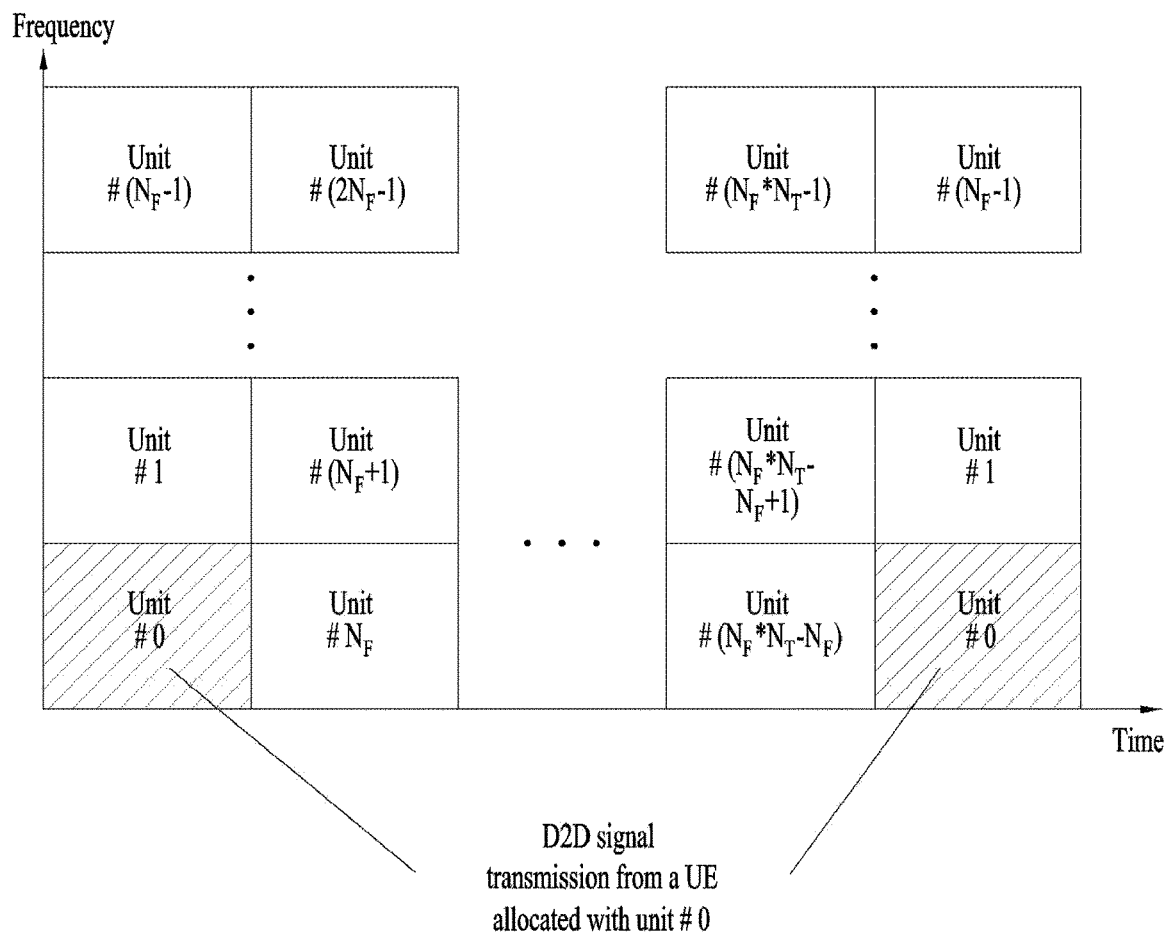

Now, a description will be given of a signal transmission method, a frequency resource hopping method, and a subframe indexing method, for D2D communication based on the above description. FIG. 8 illustrates an exemplary resource pool in a D2D communication environment. In FIG. 8(a), a first UE (UE 1) may select a resource unit corresponding to specific resources from a resource pool which is a set of resources and may transmit a D2D signal in the selected resource unit. A second UE (UE 2) may be notified of a configuration of the resource pool in which UE 1 may transmit a signal and may detect a signal transmitted by UE 1 accordingly. The resource pool configuration may be transmitted in system information by an eNB. In the absence of information about the resource pool in the system information, the resource pool configuration may be signaled upon the UE's request. In the case of a UE outside the coverage of the eNB, another UE (e.g., a D2D relay UE) may indicate the resource pool configuration to the out-of-coverage UE or the out-of-coverage UE may use a predetermined resource area.

A resource pool may include a plurality of resource units and a UE may transmit a D2D signal in one or more of the resource units. FIG. 8(b) illustrates exemplary resource units. Specifically, a total of NF×NT resource units may be defined by dividing total frequency resources into NF parts and total time resources into NT parts. Further, the resource units may be repeated in every period of NT subframes. Or the index of a Physical Resource Unit (PRB) to which one logical resource unit is mapped may be changed over time or in a predetermined pattern in order to achieve time diversity or frequency diversity. In this resource unit structure, a resource pool may mean a set of resource units available for D2D signal transmission of a UE.

A resource pool may be identified by the type of a D2D signal transmitted in the resource pool. For example, resources pools may be defined respectively for a D2D control channel (a Scheduling Assignment (SA)), a D2D data channel, and a D2D discovery channel. Further, a plurality of resource pools may be configured for each D2D signal type. The SA may be a signal including information such as the position of resources used for transmission of a subsequent D2D data channel at each transmitting UE, a Modulation and Coding Scheme (MCS) needed for demodulation of the D2D data channel, a (transmitting or receiving) UE ID, a Multiple Input Multiple Output (MIMO) transmission scheme, a timing advance, etc. This signal may be multiplexed with D2D data in the same resource unit, for transmission. In this case, an SA resource pool may refer to a pool of resources in which an SA and D2D data are multiplexed and transmitted. A resource pool for a D2D data channel may refer to a pool of resources indicated by an SA, in which a transmitting UE transmits user data. If an SA can be multiplexed with D2D data and transmitted in the same resource unit, only a D2D data channel without SA information may be transmitted in the resource pool for the D2D data channel. In other words, an RE used for transmitting SA information in an individual resource unit of the SA resource pool is also used for transmitting D2D data in the D2D data channel resource pool. A resource pool for a discovery signal refers to a resource pool for a message in which a transmitting UE transmits information such as its ID so that a neighbor UE may discover the transmitting UE. Similarly to a PBCH, a PD2DSCH is a channel transmitted together with a D2DSS, including information about a system bandwidth, a TDD configuration, and a system frame number.

In spite of the same D2D signal type/content, different resource pools may be used depending on the transmission and reception properties of D2D signals. For example, different resource pools may be defined for the same D2D data channel or discovery message, depending on a D2D signal transmission timing determination scheme (e.g., whether a D2D signal is transmitted at a reception time of an RS or with a predetermined timing advance applied to the reception time), a resource allocation scheme (e.g., whether transmission resources of an individual signal are indicated to an individual transmitting UE by an eNB or selected from a resource pool by the individual transmitting UE), a signal format (e.g., the number of symbols that each D2D signal occupies in one subframe or the number of subframes used for transmission of one D2D signal), the strength of a signal received from an eNB, the transmission power of a D2D UE, etc. For the convenience of description, in D2D communication, a scheme in which an eNB indicates transmission resources directly to a transmitting D2D UE is referred to as mode 1, whereas a scheme in which an eNB configures a transmission resource area and a UE directly selects transmission resources from the transmission resource area is referred to as mode 2. In D2D discovery, a scheme in which an eNB indicates resources directly is referred to as type 2, whereas a scheme in which a UE selects transmission resources directly from a predetermined resource area or a resource area indicated by an eNB is referred to as type 1.

Hereinbelow, a frequency hopping scheme for transmission of a D2D signal is proposed. For reference, type ½ hopping should be distinguished from type ½ discovery in the following description. Type ½ hopping refers to a frequency hopping scheme in the LTE system, whereas type ½ discovery is defined according to resource allocation schemes for D2D discovery. Therefore, type ½ hopping is applicable in discovery type ½ and communication mode ½. Thus, these terms should not be confused.

In the legacy PUSCH hopping scheme as described before, a frequency position is changed according to CURRENT_TX_NB in type 1 hopping and according to a subframe (slot) index in type 2 hopping. When a D2D signal is transmitted, an eNB indicates a Time-Resource Pattern for Transmission (T-RPT) and also the position of frequency resources in mode 1.

A D2D UE may map a block of complex-valued symbols to PRBs and then may generate and transmit an SC-FDMA signal. For a detailed description of the mapping, a UL signal transmission part defined in a 3GPP specification may be referred to. If frequency hopping is enabled during the mapping, the lowest the indexes of the PRBs may be changed between a first PRB index and a second PRB index (the first and second PRB indexes may be determined by [Equation 1]) according to a change in the transmission number for a TB. If the block of complex-valued symbols is a D2D communication signal (i.e., in the case of D2D signal transmission), the transmission number for a TB may be replaced with the index of a subframe in a D2D resource pool. That is, hopping is performed according to a change in a subframe index, not a change in the transmission number for a TB (CURRENT_TX_NB, which indicates the number of transmissions that have taken place for the MAC PDU).

In other words, each time a subframe index is changed, resources carrying a D2D packet in a resource pool for discovery or D2D communication information are shifted in frequency. This scheme may be implemented by allocating virtual frequency resources and mapping the virtual frequency resources to physical resources in a predetermined rule according to a subframe index. For example, if type 1 PUSCH hopping is applied to D2D communication, each transmitting D2D UE determines the position of frequency resources according to a subframe index, irrespective of CURRENT_TX_NB.

The indexes of the subframes of the D2D resource pool may be obtained by reindexing only the subframes of the D2D resource pool. In other words, a hopping pattern is determined according to a relative subframe index within the D2D resource pool by reindexing the subframes of the D2D resource pool. According to this scheme, when it is hard to know the accurate indexes of subframes in each resource pool (e.g., in the case of D2D resource pools of two asynchronous adjacent cells, a UE of a specific cell may know only relative subframe indexes of the D2D resource pool of the other cell, having difficulty in acquiring accurate subframe indexes of the D2D resource pool) or UL subframes are not located consecutively in TDD, hopping is performed using the relative positions of subframes in the D2D resource pool. The scheme for reindexing the UL subframes of a D2D resource pool and performing frequency shifting each time a reindexed subframe index is changed is different from the afore-proposed scheme for performing frequency shifting each time a subframe index is changed in that not actual subframe indexes but new subframe indexes produced by reindexing subframes of a D2D resource pool are used for hopping. In type 2 PUSCH hopping, for example, $n_s$ is not a slot (or subframe) index but a slot (or subframe) index produced by reindexing the subframes of a D2D resource pool.

In regard to subframe reindexing, the subframes of a resource pool for a D2D communication signal may be reindexed, starting with a first UL subframe after the end of the resource pool for a D2D control signal (i.e., the SA resource pool). In mode 1, a D2D UE may determine a resource pool for a D2D control signal and then a resource pool for a D2D communication signal based on the resource pool for a D2D control signal. The UE may transmit a communication signal using the determined resource pool for a D2D communication signal. Herein, the subframes of the resource pool for a D2D communication signal were reindexed, starting with a first UL subframe after the end of the resource pool for a D2D control signal. That is, relative subframe indexes of D2D subframes may be defined using the SA resource pool. For example, subsequent D2D subframes may be reindexed with respect to the first subframe of the SA resource pool, or the subframe reindexing may start with a first UL subframe following the SA resource pool.

In a specific reindexing method, a modulo 10 operation may be performed, while a subframe index is increased, starting from the first subframe of the resource pool for a D2D communication signal. Subframes may be reindexed in different manners in FDD and TDD. For example, the first subframe following a last subframe of the resource pool for a D2D control signal may be reindexed as subframe 0 in FDD, whereas the first UL subframe following the SA pool may be reindexed as subframe 0 in TDD because the subframe following a last subframe of the resource pool for a D2D control signal (i.e., the subframe following an SA) may be a DL subframe or a special subframe. If a D2D resource pool is not defined as described above, subframes may be reindexed based on an SA pool and frequency hopping may be performed based on the reindexed subframe indexes. If a plurality of resource pools are consecutively configured, subframes may be reindexed sequentially, starting with the first UL subframe after every SA pool as subframe 0. The subframe indexes start with 0 and increase sequentially in the subframe reindexing method. The subframe following subframe 9 may be reindexed again as 0 by modulo 10 (modulo 20 in the case of slot indexing). This is because that subframe (slot) indexes do not exceed 9 (19) during scrambling or generation of a DMRS sequence in the legacy LTE system.

Now, hopping will be described in conjunction with subframe/slot indexing. If frequency hopping is used for transmission of a D2D communication signal, the lowest the PRB indexes of PRBs to which the D2D communication signal is mapped may be changed between a first PRB index and a second PRB index according to a change in the reindexed subframe indexes. In type 2 hopping (i.e., hopping based on subbands for transmission of a D2D communication signal), a slot index used in determining a PRB index to be used may be produced by performing slot reindexing, starting with a slot of the first subframe following a resource pool for a D2D control signal. Referring to [Equation 4] and [Equation 5], a pseudorandom sequence is used in the hopping function $f_{hop}(i)$ and the mirroring function $f_m(i)$. In D2D communication, an initialization parameter for the pseudorandom sequence may be different from an initialization parameter used in a conventional technology. For example, $N_{ID}^{cell}$ may be signaled to a UE by a physical-layer signal or a higher-layer signal or may be preset to a specific value (e.g., 510) in D2D communication. A pseudorandom sequence generator may be initialized with $c_{init}=N_{ID}^{cell}$ for frame structure type 1 and $c_{init}=2^9 \cdot (n_f \bmod 4)+N_{ID}^{cell}$ for frame structure type 2. Herein, a radio frame number $n_f$ is used because if an HARQ retransmission period is 10 ms in TDD, transmission takes place continuously in the same subframe index and thus the same $f_{hop}(i)$ and $f_m(i)$ may be used. In this case, hopping may not be performed successfully. Therefore, different $f_{hop}(i)$ and $f_m(i)$ values may be used for different radio frames by differentiating initialization for the radio frames despite the same subframe index. If D2D communication is performed on a TDD carrier, $n_f$ may be set in one of the following three methods.

First, $n_f$ may be preset to a specific value (in TDD or irrespective of TDD and FDD) (e.g., $n_f=0$). This method overcomes the problem of continuous transmission in the same subframe when D2D subframe indexes are produced by relatively reindexing only the UL subframes of a D2D resource pool. Further, this method obviates the need for knowing a frame number of a D2D resource pool (or SA pool) of a neighbor cell).

Second, $n_f$ may be a specific value that the network signals by a physical-layer signal or a higher-layer signal. Or $n_f$ may be a value set for each D2D resource area or each SA resource area. Like the first method, this method may be useful when it doesn't matter whether a frame number is known or not. This method advantageously enables setting of different hopping patterns for different pools by setting a different specific value for each pool.

Third, $n_f$ may be a D2D frame number. Particularly, when cellular subframe indexes are still used without reindexing D2D subframe indexes, D2D frame numbers may be used restrictively. Or D2D frame numbers may be used all the time irrespective of subframe reindexing. For an in-coverage UE, a D2D frame number may be a cellular frame number. For an out-of-coverage UE, a D2D frame number may be induced by a GPS or signaled along with a synchronization signal (on a PD2DSCH) by an in-coverage UE. If the D2D frame numbers of a neighbor cell and a serving cell are different, a frame number offset may be signaled from the network by a higher-layer signal or a higher-layer signal or the D2D frame number of the neighbor cell may be explicitly signaled on a PD2DSCH of the neighbor cell by another UE. For detection of a D2D signal of the neighbor cell, the D2D signal may be decoded using the frame number of the serving cell+the offset signaled by the higher-layer signal or using the D2D frame number of the neighbor cell.

Meanwhile, $n_f$ may be configured in the same manner in FDD as well as in TDD. This is done in order to simplify implementation by performing similar operations in TDD and FDD.

The proposed method may be performed in the same manner in both mode 1 and mode 2 or in a different manner in each mode. For example, it may be regulated that frequency diversity is maximized by performing the UE-specific frequency hopping scheme (i.e., by performing frequency shifting each time CURRENT_TX_NB is changed) in mode 1 and the UE-common frequency hopping scheme (i.e., the afore-described method for replacing CURRENT_TX_NB with a subframe index) is performed to prevent collision between UEs in mode 2. Or the opposite case is possible, that is, the UE-common frequency hopping scheme may be used to prevent collision in mode 1, whereas the UE-specific frequency hopping scheme may be used to achieve a uniform frequency diversity gain at each selection of resources in mode 2 because collision is inevitable in mode 2. Likewise, different subframe indexing schemes may be performed in mode 1 and mode 2. For example, UL subframes following an SA resource pool may be reindexed in mode 1 and D2D subframes of a D2D communication resource pool may be sequentially reindexed in mode 2.

Meanwhile, even though a D2D resource pool is defined, subframe indexes may be reindexed as relative subframe indexes with respect to an SA resource pool. This is done to apply a common D2D subframe indexing scheme to both mode 1 and mode 2.

The foregoing subframe reindexing method may be applied in the same manner when subframe indexes are needed, as well as when frequency hopping is performed. For example, a specific one of the proposed methods may be used in generating a scrambling sequence, generating a DMRS sequence, and determining a CS/OCC.

For a legacy PUSCH, a scrambling sequence is initialized in each subframe. If the proposed subframe reindexing method is performed for D2D communication, this means that a subframe index (slot index) used for initialization of a scrambling sequence is a reindexed value. Although a scrambling sequence may not be initialized in each subframe, this case may impose a constraint on implementation because a UE should achieve an unbounded sequence unlike the scrambling sequence of the legacy PUSCH. It may be generalized that in D2D communication, a scrambling sequence may be initialized in every predetermined N subframes, not in every subframe and N may be 10, for example. This scheme may not significantly increase the implementation complexity of a UE because a scrambling sequence is as long as the scrambling sequence of the legacy PUSCH but bound.

Likewise, application of the subframe reindexing method to a DMRS sequence and frequency hopping means that legacy PUSCH hopping or a DMRS sequence is initialized at the start of each radio frame and the start of the radio frame is regarded as subframe index 0 produced by reindexing. D2D communication may be characterized in that frequency hopping (or a DMRS sequence) is initialized in every preset N subrames, not in every 10 subframes. For example, N=4 or N is dependent on a pool size (the number of D2D subframes in a pool).

Meanwhile, all or a part of the above principle may be applied to generation of a DMRS and scrambling sequence of a PD2DSCH.

Figure 9:
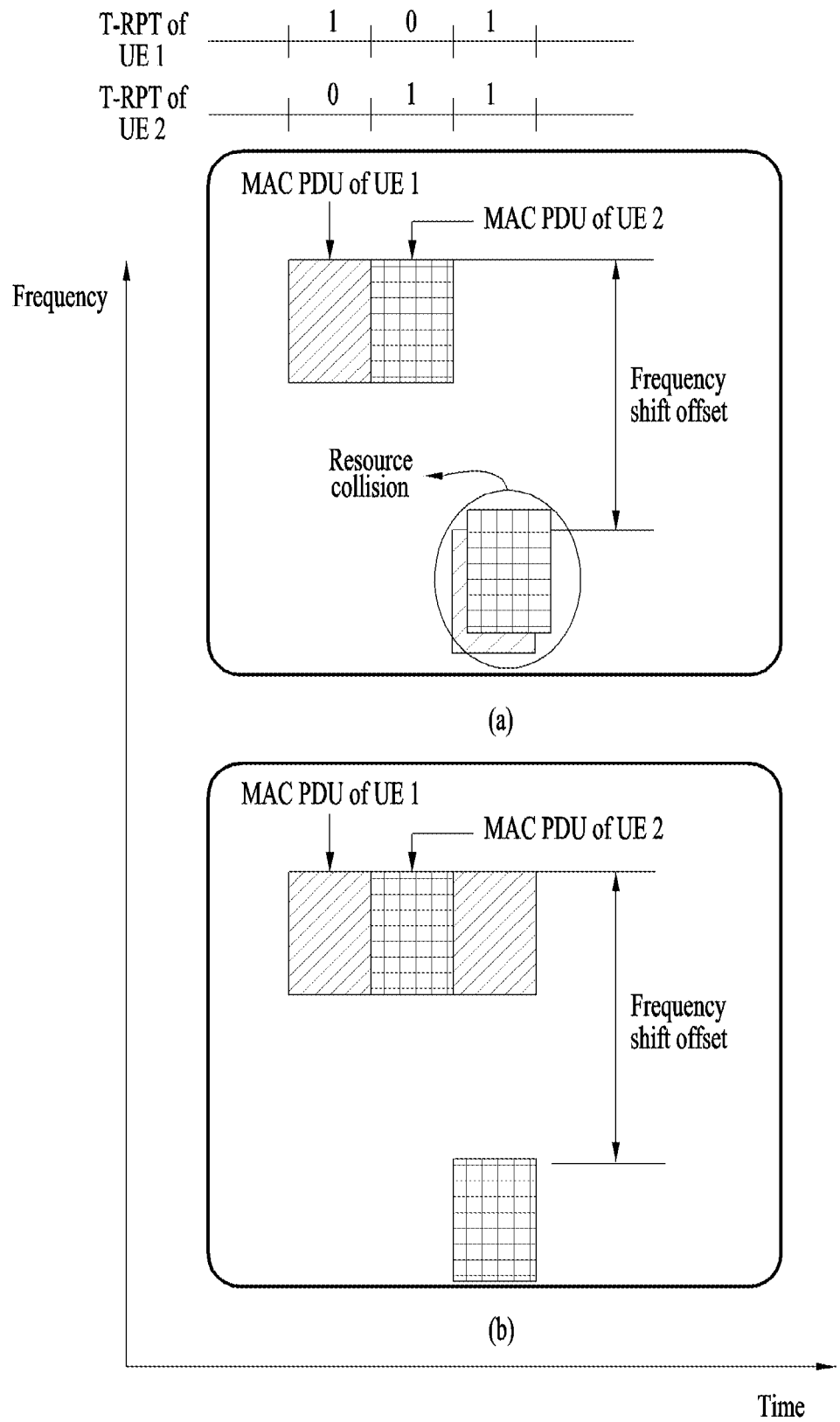

The afore-described scheme in which frequency hopping is performed based on a subframe index, not according to a change in CURRENT_TX_NB being the transmission number for a TB may prevent collision caused by hopping between UEs having different T-RPTs. This will be described with reference to FIG. 9. FIG. 9 illustrates hopping patterns for UE 1 and UE 2 having different T-RPTs. FIG. 9($a$) illustrates a case in which a hopping pattern is changed according to a change in the transmission number for a TB, CURRENT_TX_NB and FIG. 9($b$) illustrates a case in which a hopping pattern is changed according to a subframe index. In FIG. 9($a$), although UE 1 and UE 2 transmit initial TBs in different subframes, they transmit the second TBs in the same subframe according to the T-RPTs. Since hopping is performed according to CURRENT_TX_NB, both UE 1 and UE 2 perform hopping, thus causing resource collision as illustrated in FIG. 9($a$). Compared to the case illustrated in FIG. 9($a$), hopping is performed according to a change in a subframe index in FIG. 9($b$). UE 1 and UE 2 transmit initial TBs in different subframes as in FIG. 9($a$) and then the second TBs without collision after hopping.

Also, if subframe indexes were reindexed within a D2D resource pool, a communication signal transmitted by a D2D UE of a neighbor cell may be received. More specifically, as a D2D UE receives an SA of the neighbor cell, the D2D UE may be aware of the transmission timing of a communication signal of the neighbor cell. However, the D2D UE does not know a subframe number of the neighbor cell and thus will receive a communication signal from the neighbor cell based on a subframe number of its serving cell. In this case, unless the subframe number of the serving cell is coincidentally identical to the subframe number of the neighbor cell, the D2D UE may not successfully receive a communication signal (a scrambling sequence, DMRS, hopping pattern, etc. based on a subframe index) from the neighbor cell. Therefore, the D2D UE may be allowed to receive a D2D communication signal from a neighbor-cell UE by reindexing the indexes of subframes in a D2D subframe pool as in an embodiment of the present invention.

A hopping scheme according to another embodiment of the present invention will be described below.

Hopping may be performed based on CURRENT_TX_NB during D2D signal transmission. That is, each time CURRENT_TX_NB is changed, the position of a frequency area is changed. This hopping scheme may advantageously maximize the frequency diversity of each D2D packet. In type 1 hopping, for example, a D2D signal is transmitted at a frequency position shifted by a predetermined frequency offset (e.g., a half of the number of RBs in a PUSCH region). The size of the frequency offset may be predetermined or signaled to a UE by a physical-layer signal or a high-layer signal. Particularly, the size of the frequency offset is signaled in RBs or in units of a minimum or maximum resource unit size of a D2D signal.

CURRENT_TX_NB may be initialized to 0 each time an initial MAC PDU is transmitted within a D2D resource period and may be increased by 1 each time the same MAC PDU is transmitted. In this case, frequency diversity may be maximized because hopping is applied to each MAC PDU. Such hopping based on CURRENT_TX_NB is illustrated in FIG. 10($a$).

Figure 10:
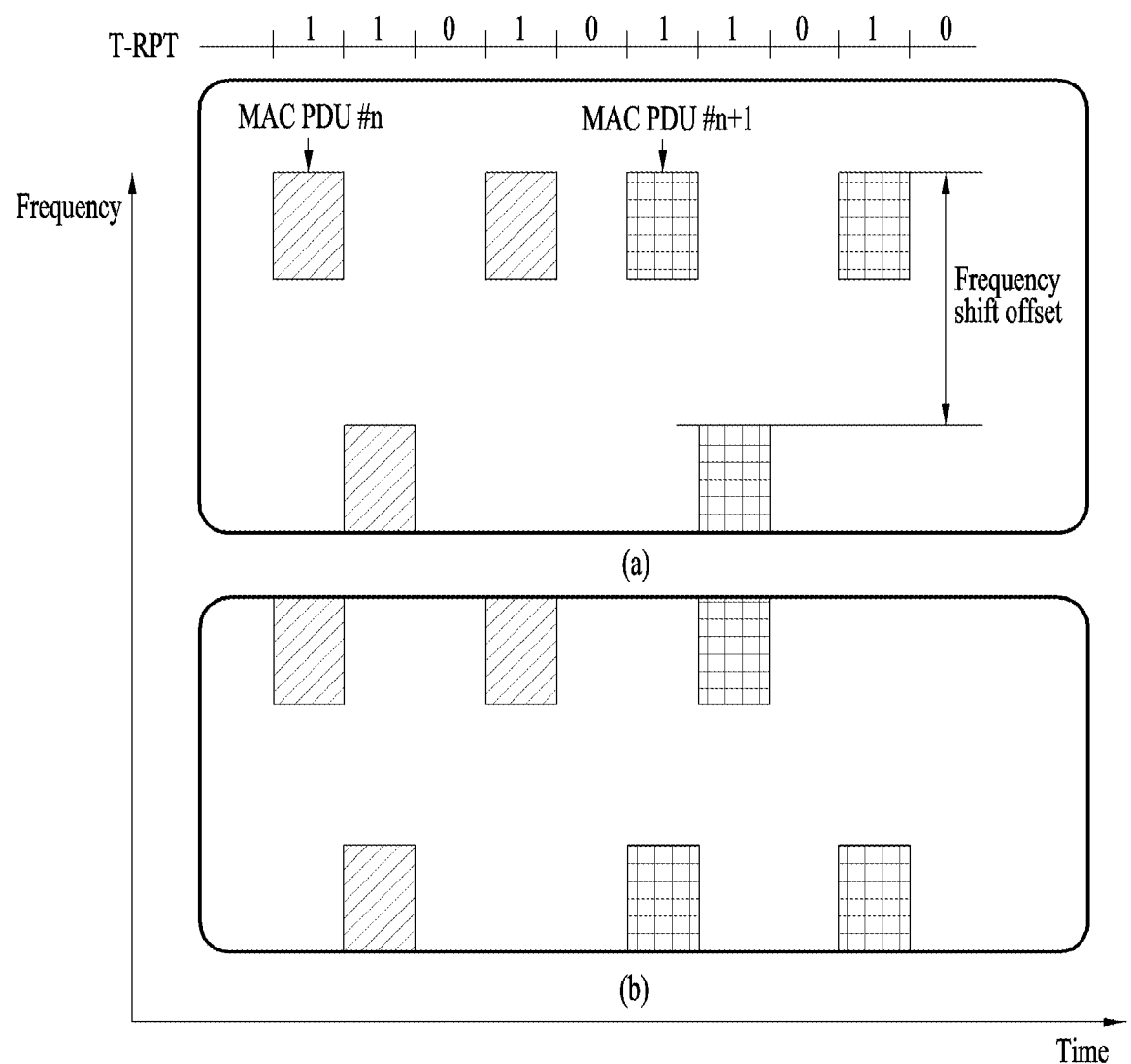

Or to perform hopping in the manner illustrated in FIG. 10($b$), CURRENT_TX_NB may be initialized to 0 in each D2D resource period and increased by 1 each time a transmission takes place within the D2D resource period. That is, a new parameter (e.g., TX_NB_IN_PERIOD) is defined and this parameter is increased by 1 at each transmission within the period. This hopping scheme advantageously simplifies a hopping pattern because a signal is transmitted in a shifted frequency area at each transmission and the frequency area is shifted irrespective of the number of MAC PDUs.

The afore-described hopping schemes (frequency hopping types) according to the embodiments of the present invention may be changed depending on transmission modes.

In a first method, a hopping pattern configured for use in a PUSCH by the network may be used in mode ½. For example, if the network configures type 2 hopping for a PUSCH, a D2D signal is also transmitted based on a type 2 hopping pattern. To enable receiving D2D UEs to determine a used hopping pattern, the network may signal a hopping type and higher-layer parameters (e.g., $N_{RB}^{HO}$ and $N_{sb}$) based on the hopping type to UEs by a physical-layer signal or a higher-layer signal. A cell ID is needed for type 2 PUSCH hopping (to determine a subband hopping pattern and a mirroring pattern). The cell ID may be fixed to a specific value or signaled by a physical-layer signal or a higher-layer signal. Or the mirroring pattern and the subband hopping pattern may be predetermined patterns or patterns linked to a specific ID. For example, a subband size may be 1 and subband hopping is not always performed, while the mirroring pattern may be set to 1010 . . . . For an out-of-coverage UE, these parameters and the hopping type may be preset to specific values. This method may advantageously avoid collision between a Wide Area Network (WAN) signal and a D2D signal because the legacy cellular signal and the D2D signal have the same hopping pattern. These hopping parameters may be set separately for each D2D resource pool. For this purpose, the network may signal the hopping parameters for each D2D resource pool to the UE by a physical-layer signal or a higher-layer signal. For example, a specific D2D resource pool may use type 2 PUSCH hopping and another D2D resource pool may use type 1 PUSCH hopping. A hopping mode, parameters, and whether hopping is performed or not may be determined differently depending on a discovery type and a communication mode, and a different hopping method may be applied to each discovery or communication resource pool.

In a second method, hopping configured for use in a PUSCH by the network may be used in mode 1, whereas a predefined hopping pattern may be used for D2D communication in mode 2. The predefined hopping pattern may be fixed to a specific one of legacy hopping patterns used for a PUSCH, or may be one of the afore-described hopping schemes according to the embodiments of the present invention or a newly defined hopping pattern. It may be regulated that type 1 PUSCH hopping is always used in mode 2. Parameters used for type 1 hopping (a frequency shift size N_PUSCH_RB/2 or +/−N_PUSCH_RB/4, N_PUSCH_RB, and a hopping offset) may be parameters for a D2D resource pool configuration. For example, N_PUSCH_RB may be the frequency resource size of a D2D resource pool, and the hopping offset may be determined by the starting and ending points of the D2D frequency resource pool. The network may determine whether frequency hopping is applied or not. A frequency hopping mode (or a non-frequency hopping mode) may be set as a default mode for an out-of-coverage UE.

In a third method, aside from a legacy hoping type indicated for a PUSCH by the network, a predetermined hopping pattern may be used in mode 1/mode 2. The predetermined hopping pattern may be fixed to a specific type in the legacy PUSCH hopping scheme, may be set to one of the afore-described hopping schemes according to the embodiments of the present invention, or may be a third hopping pattern. Parameters used for the hopping (a frequency shift size N_PUSCH_RB/2 or +/−N_PUSCH_RB/4, N_PUSCH_RB, and a hopping offset) may be determined using parameters for a D2D resource pool configuration. For example, N_PUSCH_RB may be the frequency resource size of a D2D resource pool, and the hopping offset may be determined by the starting and ending points of the D2D frequency resource pool. This method advantageously allows RRC_IDLE-state receiving D2D UEs to effectively receive a D2D signal because they may determine the hopping pattern of the D2D signal without receiving an additional parameter. Despite the advantage, the third method may cause collision with the hopping pattern of a PUSCH. To avoid the problem, an eNB should perform scheduling in such a manner that collision may not occur between a WAN PUSCH and a D2D PUSCH. It may be generalized that whether frequency hopping is performed is determined for each pool by a physical-layer signal or a higher-layer signal in mode 2 and a preset hopping mode is used for an out-of-coverage UE. For this purpose, the network may signal hopping parameters for each D2D resource pool separately to UEs by a physical-layer signal or a higher-layer signal. For example, a specific D2D resource pool may use type 2 PUSCH hopping and another D2D resource pool may use type 1 PUSCH hopping. A hopping mode, parameters, and whether hopping is performed or not may be determined differently depending on a discovery type and a communication mode, and a different hopping method may be applied to each discovery or communication resource pool.

Meanwhile, for an SA or type 1 discovery, a frequency hopping type may be preset so that receiving D2D UEs may decode a signal without any additional signaling. One or more of the afore-described hoppings may be applied to the SA and/or type 1 discovery.

A part of the afore-described methods are applicable to discovery.

Configurations of Apparatuses According to Embodiment of the Present Invention

Figure 11:
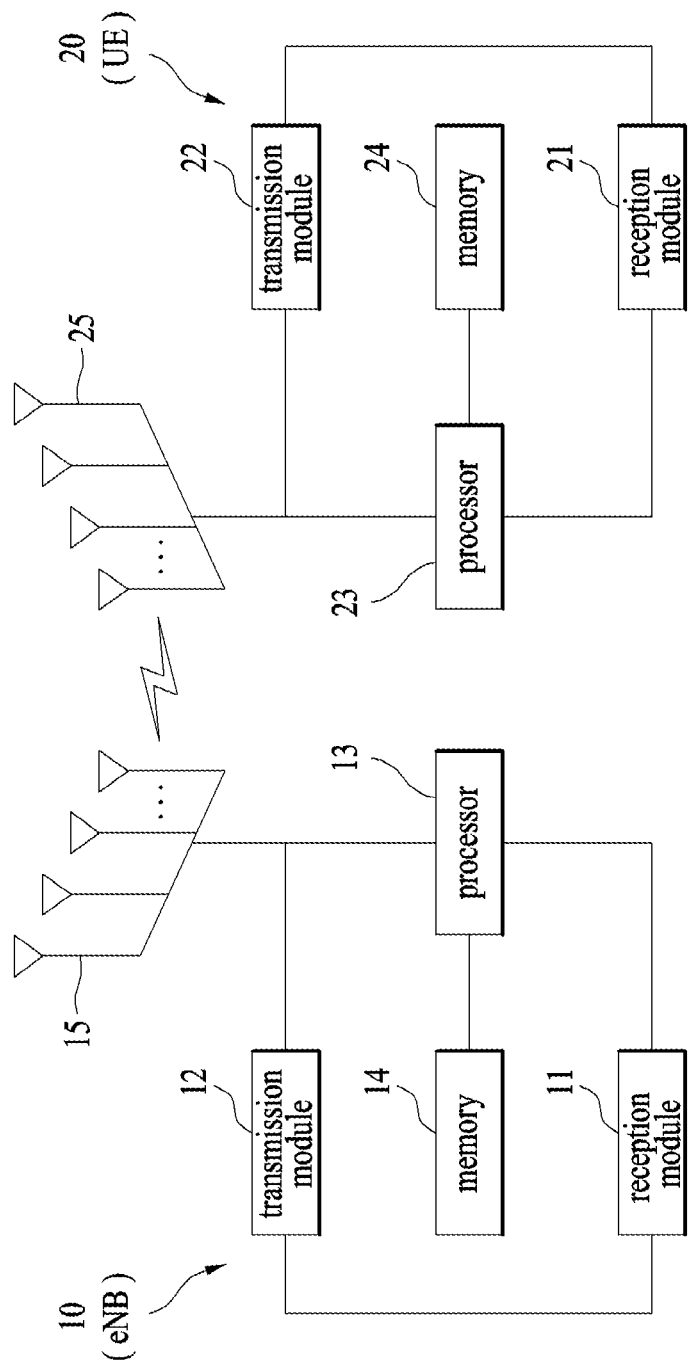
FIG. 11 is a block diagram of a transmission apparatus and a reception apparatus.

FIG. 11 is a block diagram of a transmission point and a UE according to an embodiment of the present invention.

Referring to FIG. 11, a transmission point 10 according to the present invention may include a Reception (Rx) module 11, a Tx module 12, a processor 13, a memory 14, and a plurality of antennas 15. Use of the plurality of antennas 15 means that the transmission point 10 supports MIMO transmission and reception. The reception module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

Besides, the processor 13 of the transmission point 10 processes received information and information to be transmitted to the outside of the transmission point 10. The memory 14 may store the processed information for a predetermined time and may be replaced with a component such as a buffer (not shown).

Referring to FIG. 11 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

Besides, the processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 10 in FIG. 11 is applicable to a relay as a DL transmitter or a UL receiver, and the description of the UE 20 in FIG. 11 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The afore-described embodiments of the present invention are applicable to various mobile communication systems.

What is claimed is:

1. A method for transmitting a sidelink communication signal by a sidelink User Equipment (UE) in a wireless communication system, the method comprising:
   determining a set of subframe for the sidelink communication signal, and
   transmitting the sidelink communication signal based on the set of subframe for the sidelink communication signal,
   wherein subframes of the set of subframe are firstly re-indexed, starting from a first subframe of the set of subframe,
   wherein subframes in the firstly re-indexed subframes are secondly reindexed with a modulo 10 operation.

2. The method of claim 1, wherein downlink subframes and special subframes are not included in the set of subframe.

3. The method according to claim 1, wherein the secondly reindexed subframes are used for frequency hopping of the sidelink communication signal.

4. The method according to claim 1, wherein slot indexes of the secondly reindexed subframes are used for frequency hopping of the sidelink communication signal.

5. A sidelink User Equipment (UE) for transmitting a sidelink communication signal in a wireless communication system, the UE comprising:
   a memory,
   one or more processors coupled to the memory,
   wherein the processor configured to determine a set of subframe for the sidelink communication signal, to transmit the sidelink communication signal based on the set of subframe for the sidelink communication signal,
   wherein subframes of the set of subframe are firstly re-indexed, starting from a first subframe of the set of subframe,
   wherein subframes in the firstly re-indexed subframes are secondly reindexed with a modulo 10 operation.

6. The UE of claim 5, wherein downlink subframes and special subframes are not included in the set of subframe.

7. The UE of claim 5, wherein the secondly reindexed subframes are used for frequency hopping of the sidelink communication signal.

8. The UE of claim 5, wherein slot indexes of the secondly reindexed subframes are used for frequency hopping of the sidelink communication signal.

* * * * *